UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

OCTADIONOLS.

991,734. Specification of Letters Patent. Patented May 9, 1911.

No Drawing. Application filed June 28, 1910. Serial No. 569,330.

*To all whom it may concern:*

Be it known that we, GEORG MERLING, professor of chemistry, doctor of philosophy, and HUGO KÖHLER, doctor of philosophy, citizens of the German Empire, residing at Elberfeld, Germany, have invented new and useful Improvements in Octadionols, of which the following is a specification.

The present invention relates to the manufacture and production of the hitherto unknown octadionols. The process for their production consists in treating methylene ketones with alkaline condensing agents of a mild action, such as carbonates of alkalis, borax, sodium phosphate, in heating methylene ketones or their homologues with water with or without the addition of acids, such as formic acid or by the addition of water to octenedione or its homologues. On starting *e. g.* from methyleneethylmethylketone the saturated 1.5-diketone (dimethyloctadionol)

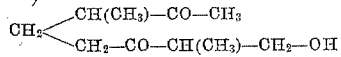

is obtained.

The new bodies are valuable intermediate compounds for producing pharmaceutical products or other technically valuable products. They are limpid oils soluble in water, ether, alcohol and benzene.

In order to illustrate the new process more fully the following examples are given, the parts being by weight:—

Example 1: In a vessel provided with a reflux condenser a solution of 200 parts of methylene-ethylmethylketone in 6000 parts of water and from 5 to 10 parts of concentrated formic acid is heated on the water bath during from 40 to 50 hours. Unchanged methylene-methylethylketone is removed by distillation with steam and 20 parts of anhydrous sodium carbonate are added to the liquid in the vessel. After cooling the solution is saturated with common salt, filtered and the filtrate is extracted with ether. The ethereal solution is dried over potassium carbonate and the ether is distilled off. Dimethyloctadionol remains. Its formation takes probably place according to the following formula:

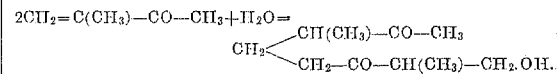

It is a limpid oil soluble in water, boiling at 148° C. under a pressure of 18 mm. Its semicarbazone melts at 209–210° C.

Example 2: 100 parts of methylene acetone are allowed to stand during 2–3 days with a solution of 5–10 parts of $K_2CO_3$ in 1500 parts of water until the intense smell of methylene acetone has disappeared. The solution is then acidulated with tartaric acid, saturated with ammonium sulfate and is extracted several times with ether. The ethereal solutions are dried over sodium sulfate, and the ether is distilled over. A limpid oil remains boiling at 80–170° C. under a pressure of 21 mm. From this oil octadionol

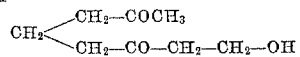

can be isolated. Its formation takes probably place according to the following formula:

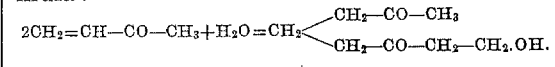

Octadionol is a limpid thick oil boiling at from 142–143° C. under a pressure of 22 mm. It is soluble in water, alcohol and ether.

The same product results by boiling methylene acetone (1 part) with water (10 parts).

We claim:—

1. The herein described octadionols, obtainable from methylene ketones, which products are limpid oils soluble in water, ether, alcohol and benzene, substantially as described.

2. The herein described dimethyloctadionol, obtainable from methylene-ethylmethylketone, which is a limpid colorless oil boiling at 148° C. at 18 mm. pressure, soluble in water, alcohol and ether, its semicarbazone melting at 209–210° C. substantially as described.

In testimony whereof we have hereunto set our hands in the presence of two subscribing witnesses.

GEORG MERLING. [L. S.]
HUGO KÖHLER. [L. S.]

Witnesses:
WALTER VONNEGUT,
ALFRED HENKEL.

Copies of this patent may be obtained for five cents each, by addressing the "Commissioner of Patents, Washington, D. C."